OR  3,712,709

United States
Kenworthy

[11] 3,712,709
[45] Jan. 23, 1973

[54] VARIABLE LIGHT TRANSMISSION DEVICE

[75] Inventor: John Grahame Kenworthy, Runcorn, Cheshire, England

[73] Assignee: Imperial Chemical Industries Limited, London, England

[22] Filed: Nov. 22, 1971

[21] Appl. No.: 200,776

[52] U.S. Cl. ........350/160 R, 260/250 R, 260/294.9, 260/296 D
[51] Int. Cl. ..........................G02f 1/36, C07d 31/42
[58] Field of Search ....350/160 R; 260/294.9, 250 R, 260/296 D

[56] References Cited

UNITED STATES PATENTS 3,652,149    3/1972    Rogers..............................350/160 R Primary Examiner—Ronald L. Wibert
Assistant Examiner—V. P. McGraw
Attorney—Cushman, Darby & Cushman

[57] ABSTRACT

Device for light transmission control in response to electrical signals. A N-substituted p-cyanophenyl derivative of, for example, a bipyridyl is reversibly transformed between the cationic form (colorless) and radical (usually green) by application of potential between a transparent conducting electrode and a counter electrode.

7 Claims, 2 Drawing Figures

VARIABLE LIGHT TRANSMISSION DEVICE

This invention relates to a device for control of light transmission, in which the control is effected by electrical means.

A device according to our invention comprises a working electrode having radiation transmission or reflection properties; an active material, comprising an N(p-cyanophenyl) substituted derivative of a bicyclic compound having two nitrogen containing rings, in contact with the working electrode surface; a counter electrode also in contact with the active material, said counter electrode being disposed with respect to the working electrode in such a way that the passage of radiation through the device is not materially affected by reactions occurring at the counter electrode. Preferably the counter electrode is out of the path of the radiation passing through the device or obstructs at most only 10 percent of the working area of the device The N(p-cyanophenyl) compound is reversibly electrolytically reduced in the device to a radial species which is colored, usually green, while the parent compound is colorless or pale yellow.

The working electrode surface must obviously be conducting, but a high degree of conductivity is not essential. It will normally be two dimensional, that is, a flat surface or a surface curved in one or more planes. For a device in which light is transmitted through the electrode, it must be transparent or translucent, for which purpose a glass with a coating of a conducting oxide or a very thin metal film is required. For reflective devices, a metal surface may be used, or a transparent or translucent electrode may be backed by an reflecting surface, e.g., metal or other opaque reflecting material, e.g., white pigmented thermoplastic sheet.

Examples of active materials are simple salts or polymeric forms of mono- or di-N-substituted-p-cyanophenyl derivatives of bipyridyls, diazapyrene, or biquinolyls. The preferred compounds are N,N'-di(p-cyanophenyl)4,4' chloride. If the simple salt is used, deposition of the insoluble colored radical cation species occurs over the plane surface of the working electrode. As the simple radical cation is insoluble it does not diffuse away from the electrode surface, and is easily reoxidized to the colorless form by reversal of the applied potential.

Alternatively the active material may contain the (p-cyano-phenyl) group attached to a polymeric structure. For example a 4-(4'-pyridyl)N-p-cyanophenyl pyridinium salt reacts with polyvinyl chloracetate or copolymers thereof with polyvinyl alcohol to form an active material for use in the invention. If polyvinyl alcohol units are present these may be cross-linked, e.g., with glyoxal, to give a gelled active material.

The active material usually used in the presence of an aqueous medium, e.g., water or a water soluble polymer such as agar, gelatine, methyl cellulose, polyvinyl alcohol or polyvinyl-pyrrolidone. An inert electrolyte may be added to the medium to increase conductivity. Alkali metal salts, such as halides or fluoroborates are preferred.

Examples of anions which may be associated with the active materials are halides, especially chloride, $SO_4^-$, $HSO_4^-$, $RSO_4^-$ (where R is an alkyl group) $SiF_6^-$ or $BF_4^-$.

Any electrochemical reaction at the working electrode is accompanied by a corresponding reaction of the counter electrode. It is desirable that the products of the counter electrode reaction should not interfere with the light reflections or transmission properties of the device. This may be achieved in one of several ways.

1. The counter electrode is a metal electrode of small surface area compared with the working electrode surface, for example metal wiring or strips preferably surrounding the edges of the working electrode surface. The counter electrode is in contact with the same solution as the working electrode, and so the reaction is the opposite of that at the working electrode, i.e., the colored material dissolves from the counter electrode whilst it is being formed at the working electrode and vice versa. The surface area of the counter electrode is preferably at least 1 percent of that of the working electrode to permit the thickness of the deposited layer becoming so great that it breaks away. It is desirable to precoat the counter electrode electrolytically with radical salt before assembly. This avoids the possibility of gas bubble formation during the first operational cycle.

2. The counter electrode is a metal in contact with an insoluble salt, the anion of the insoluble salt being common to the active species, preferably, e.g., silver/silver chloride, with the active species being the chloride salt of the p-cyanophenyl derivative. In this case the electrode reaction is

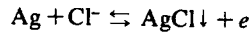

$$Ag + Cl^- \leftrightarrows AgCl\downarrow + e$$

and there are no colored or soluble products to interfere with the optical properties of the device. The silver metal is preferably in the form of a fine gauge in order to maximize the surface area.

An advantage of this type of arrangement with an insoluble reactant at the counter electrode is that the counter electrode reaction may be quite different from the working electrode reactions, but no membrane is required to separate the two electrodes if the reaction potentials are chosen appropriately.

Electrochemical oxidation of the colored species is facilitated by the addition of an easily oxidizable material which is colorless, or only lightly colored, and is soluble in both oxidation states. The redox potential of the additive must be such that the oxidized form will oxidize the insoluble colored form of the active material. Thus the additive acts as an electrochemical oxidation catalyst. A preferred additive is a soluble ferrocyanide such as sodium ferrocyanide in for example 0.1M concentration.

A third electrode may optionally be included as a reference electrode for potential control purpose. The quantitative voltage measurement a silver/silver chloride/potassium chloride (saturated) electrode may be used. For convenience this half-cell is contained in a capillary tube which has a porous asbestos fiber sealed into the end to provide electrical contact with the main electrolyte. For qualitative measurements a simple silver wire in contact with the main electrolyte may be used.

By way of example, one device according to our invention will now be described with reference to the accompanying drawing, in which.

Figure 1:
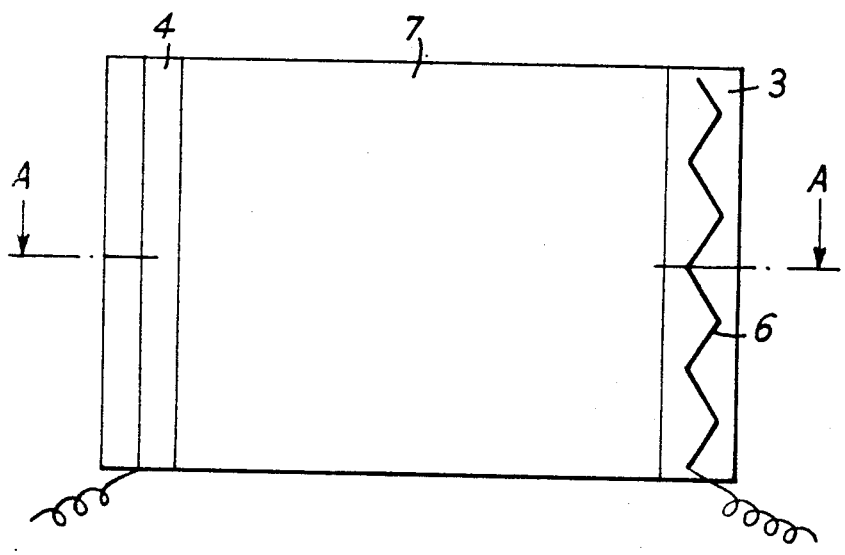
FIG. 1 is a plan view of the device.
Figure 2:
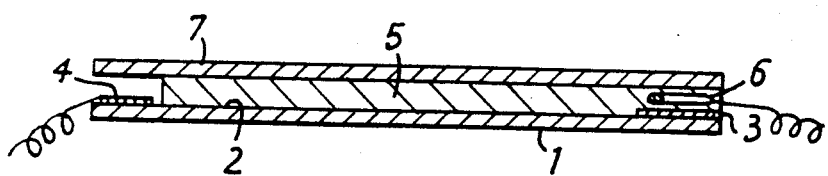
FIG. 2 is a section along the line A—A of FIG. 1.

A base 1 is formed from a rectangular sheet of conductive ('Nesa') glass of resistance 80 ohms/square. The conducting layer (uppermost) provides the electrode surface 2. Near opposing edges of the base 1 are applied an insulating strip 3 of cellulose acetate and a silver paint stripe 4 the latter providing electrical contact with the electrode surface 2. A layer 5 of an agar jelly stabilized aqueous solution of, as active component, N,N'-di(p-cyanophenyl)4,4'-bipyridilium dichloride was applied to the electrode surface 2. The concentration of active component was $10^{-3}$M in 0.1 N aqueous sulphuric acid. The layer 5 was applied over a platinum wire counter electrode 6, itself applied over the insulating strip 3. The device is completed with an upper protective glass sheet 7. Electrical connection is made to the counter electrode 6 and silver paint stripe 4.

In use, a potential of −0.2 volts (relative to a silver/silver chloride reference electrode applied to the electrode surface caused deposition of the insoluble green radical cation as an even layer, thereby reducing light transmission. (Application of a lower voltage (−0.4 volts) caused two electron reduction to the dihydro compound and is not so desirable). The device can be open circuited and the green color remains stable for several hours. Reversal of the potential to +1.0 volts caused bleaching of the electrode surface in one minute.

In another device constructed as above, the counter electrode was electrolytically precoated with the radical cation salt before assembly. This avoids the possibility of gas bubble formation during the first operational cycle.

The platinum wire may be replaced by a wire of other inert metal, e.g., copper, as the counter electrode.

Application of white backing below the base gives a device in which reflection properties can be varied.

The use of an active composition made up from $10^{-3}$M N,N'-di(p-cyanophenyl)4,4'-bipyridinium dichloride, 0.1M potassium chloride and 0.1M sodium ferrocyanide, gelled with 5 percent gelatine gave a device which could be bleached rapidly with an applied potential of +0.4 volts(relative to a silver/silver chloride reference electrode)

Good results were also obtained by replacing the last mentioned bipyridyl compound with a copolymer of polyvinyl-alcohol and polyvinyl chloracetate, the latter groups being quaternized with 4-(4-pyridyl)-pyridinium chloride. The copolymer can be cross-linked by immersion in glyoxal solution.

A further improvement is gained by using as the counter electrode a silver wire precoated with silver chloride by electrolysis of a hydrochloric acid solution using the silver wire as the anode.

If the counter electrode is a wire of grid which is not hidden by the frame, and if the resistance of the solvent is high, e.g. in the above example the only electrolyte salt is the $10^{-3}$M N,N'-di(p-cyanophenyl)-4,4'-bipyridylium dichloride, the current tends to take the shortest path and deposition on the working electrode surface occurs preferentially in the area closest to the counter electrode. Then the dark image is formed on the electrode surface in the shape of the counter electrode, which may be alpha numeric. The image is in the form of a thicker darker line than the counter electrode, and may be erased by reversal of polarity. Multiple counter electrodes, e.g., numerals 0–9 may be used to provide numeric display.

What we claim is:

1. A device for control of light transmission or reflection which comprises a working electrode, having radiation transmission or reflection properties; an active material comprising an N(p-cyanophenyl) substituted derivative of a bicyclic compound having two nitrogen containing rings, in contact with the working electrode surface; a counter electrode also in contact with the active material, said counter electrode being disposed with respect to the working electrode in such a way that the passage of radiation through the device is not materially affected by reactions occuring at the counter electrode.

2. A device according to claim 1 in which the counter electrode obstructs not more than 10 percent of the working area of the device.

3. A device according to claim 1 in which the working electrode is a tin oxide coated glass.

4. A device according to claim 1 in which the active material is a N,N'-di(p-cyanophenyl)-4,4'-bipyridyl salt.

5. A device according to claim 1 in which the active material is a copolymer of polyvinyl alcohol and polyvinyl chloracetate quaternized with a 4-(4-pyridyl)N-p-cyanophenyl pyridinium salt.

6. A device according to claim 1 in which the counter electrode is a silver wire coated with silver chloride.

7. A device according to claim 1 in which a water soluble ferrocyanide salt is added to the active material.

* * * * *